Patented Jan. 27, 1953

2,626,707

UNITED STATES PATENT OFFICE 2,626,707

CLASSIFICATION OF CALCINED CONDITIONED TITANIUM DIOXIDE PIGMENT SLURRIES

Walter R. Whately, Lynchburg, Va., assignor to American Cyanamid Company, New York, N. Y., a corporation of Maine No Drawing. Application April 3, 1951,
Serial No. 219,117

3 Claims. (Cl. 209—5)

This invention relates to the production of titanium dioxide pigment characterized by improved smoothness of texture and freedom from abnormally large particles. More particularly, the invention relates to a method of removing from calcined conditioned titanium dioxide pigment slurries pigment particles larger than about 4 microns in size.

In the manufacture of titanium dioxide pigment, the oxide, immediately after its formation by calcination, usually consists of relatively large aggregates which are sintered to a certain extent. These aggregates are subjected to one or more types of disintegration such as wet and/or dry grinding processes wherein the calcined oxide is passed through ball mills, pebble mills, jet mills, and the like commercially available grinding apparatus. In these grindings, the major portion of the calcined oxide is reduced to discrete particles, or to tiny aggregates which are less than about 4 microns in size and which are well suited for use in coating vehicles. However, no commercial grinding is perfect, and a certain proportion of the ground material recovered as product consists of aggregates which are larger than about 4 microns in size. These latter particles are sufficiently large to project from the ultimate film of paint, lacquer or the like, and cause irregularities which are sufficiently pronounced to be detected by the naked eye.

In the ordinary commercial production of titanium dioxide pigment, the calcination of titania hydrate to titanium dioxide is carried out in the presence of small amounts of mineralizing agents such as the alkali metal carbonates. Sufficient amounts of these agents adhere to the pigment particles, even after the prolonged wet grindings mentioned above, to prevent the aqueous dispersion of the pigment which is a necessary preliminary step to the removal of the larger particles. In the case of these pigments, which have simply been mineralized, the problem of aqueous dispersion has been overcome largely by the addition, prior to or during a wet grinding treatment, of a small amount of a dispersing agent. As a result, the +4 micron particles have been readily removed from pigment slurries of this type by subsequent ordinary hydroclassification.

Recently, however, the pigment industry has developed methods of improving titanium dioxide pigment by carrying out the calcination of titania hydrate in the presence of metallic oxides such as zinc oxide and tin oxide. These oxides are not mineralizing agents but are conditioning agents, employed to facilitate the conversion of the titania to its rutile crystal modification, and to improve the ultimate texture of the pigment and its resistance to chalking. Calcined titanium dioxide produced from titania hydrate which has been conditioned contains from about 0.6–2.5% of occluded water-soluble salts as well as the 1% or more of the conditioning agent. This pigment (hereinafter referred to as "calcined, conditioned titanium dioxide pigment") is obtained in a state of extreme flocculation, and even after intensive wet grindings it has proved virtually impossible to separate the large +4 micron pigment particles and aggregates containing such unusually high percentages of water-soluble salts by any of the usual methods of hydroclassification. The addition of the ordinary dispersing agents, for example, from about 0.5% to about 1% of sodium hydroxide or sodium carbonate, has not induced any deflocculation or dispersion of slurries of conditioned pigments of this type. Consequently, the difficulty of classifying calcined, conditioned titanium dioxide pigments has seriously limited their usefulness.

The present invention is based on the discovery that an aqueous slurry of such calcined, conditioned titanium dioxide pigments may be hydroclassified and the +4 micron particles removed if a critically small amount of an alkali metal silicate is present therein and if the hydroclassification is performed within a critically short time after the slurry has been agitated. The addition of an alkali metal silicate, for example, from about 0.1% to about 2.0% and preferably from about 0.2% to about 0.6% of sodium silicate calculated as $SiO_2$ and based on the weight of titanium dioxide in the slurry, coupled with agitation, in some manner permits liberation of the +4 micron particles and surprisingly, permits separation thereof by ordinary centifugal hydroclassification if the classification is performed within about 3 to about 10 minutes of cessation of the agitation. Thereafter, it again becomes virtually impossible to classify the pigment by any means unless the slurry is subjected to renewed agitation. The addition of silicate has no other noticeable effect on the pigment.

The addition of more than about 0.6% of sodium silicate does not increase either the recovery of the fines portion of the pigment nor does it aid the separation from the slurry of pigment particles larger than 4 microns in size. In fact, the use of substantially more than about 0.6% of silicate, for example, more than about 1.0%, actually results in a lowering of the final texture value of the finished pigment. On the other hand, the addition of less than about 0.1% of sodium silicate does not serve to permit hydroclassification of the pigment slurry with separation of the +4 micron particles. The addition of amounts of sodium silicate within the above specified range may be made directly to the slurry, the pH of which ordinarily varies from slightly acid to decidedly alkaline as, for example, from about pH 6.3 or 6.4 to about 8.1 or 8.2 or higher. Equivalent amounts of potassium silicate may also be used. The addition may be made before, during or after the conventional wet milling. It has also been found that hydroclassification, which preferably is centrifugal hydroclassification, may best be carried out by adjusting the solids content of the aqueous pigment slurry to about 10–25%. This range is not critical, and any mobile slurry may be used as required by the classifier.

The alkali metal silicate addition should be attended by a mechanical agitation of the slurry. Where this addition is made before or during wet grinding, the action of the mill itself is sufficient provided the classification step is performed about 3 to 10 minutes after cessation of the grinding. Where a longer period elapses, it is usually necessary that the slurry thereafter be agitated sufficiently to liberate the +4 micron particles and this may be carried out by any desired means. Ordinary stirring for a few moments is sufficient for this purpose.

The reason why alkali metal silicates, when added in the above-described percentages, permits liberation of the +4 micron particles in the critical period is not known, and it is not intended that this invention be limited by any particular theory.

It is a particular advantage of the present invention that failure to hydroclassify the silicate treated slurry within the critical period of time does not necessarily involve the loss of any material. Even if the critical period has passed, by as much as 24 hours, all that need be done to liberate the +4 micron particles is to agitate the slurry for a few seconds, whereupon the +4 micron particles may be removed by hydroclassification substantially as effectively as if the classification had been performed immediately after the initial addition of the silicate.

It is a further particular advantage of the present invention that it may be completely performed in ordinary commercial equipment, and that no complicated and delicate gravity settling or decantation steps are necessary. The hydroclassification step may be and preferably will be performed in a commercial continuous classifying centrifuge, which has a very large output of material per unit, but the type of equipment used is no part of the present invention.

The invention will be more fully described by the following specific examples. It should be understood, however, that although these examples may describe in detail some of the specific features of the invention, they are given primarily for purposes of illustration and the invention in its broader aspects is not limited thereto.

EXAMPLE 1

300 g. of a rutile $TiO_2$ pigment derived from a titania hydrolysate which had been calcined in the presence of 1.0% ZnO, which pigment contained 0.7% of water-soluble salts was charged to a pebble mill containing 450 g. of water. To this mixture was added a sodium silicate solution containing the equivalent of 0.3% $SiO_2$, based on the weight of $TiO_2$. The sodium silicate in the solution analyzed as the equivalent of the reaction product of 3.75 mols of $SiO_2$ with 1 mol of $Na_2O$. After a 4 hour milling period, the mill was emptied and the recovered slurry diluted with water to a $TiO_2$ content of 250 g. per liter. The slurry was then vigorously agitated by manual stirring for a few seconds and the +4 micron particles thus liberated. One portion of the slurry was removed and classified in a centrifuge to remove substantially all pigment particles 4 microns or larger in size. Three minutes elapsed from the time that the manual stirring was stopped until the fines portion had been decanted from the centrifuged sludge. The resulting fines portion contained 72% of the original amount of $TiO_2$ and had a texture rating of 6 by the following test method.

Texture test method

An aqueous $TiO_2$ slurry is flocculated by adding 0.6% $MgSO_4$ based on the $TiO_2$ content, and dewatering to obtain a filter cake of 50% solids. 1.0 g. of this wet cake is mixed with 1.0 cc. of a commercially prepared water-soluble drying oil, for example, Ucon HB 5100 oil, manufactured by Carbide and Carbon Chemicals Corp. After these materials have been thoroughly mixed, an additional 2.0 cc. of oil is added and the composite is again thoroughly mixed. A pulldown of this mixture is made employing a Hegman gauge having a slot 5" long tapering from a maximum depth of 0.022" at one end to 0.000" at the opposite end. The slot is marked off into 8 equal divisions numbered from 0 at the 0.002" end to 8 at the 0.000" end of the slot. The pulldown film is viewed at an angle to detect the point above which no particles project from the film surface. This point is rated according to its position on the scale. A texture rating of 8 is perfect, indicating that no particles larger than about 1 micron in size are present, while a rating of 0 is the lowest possible. A rating of 6 or higher on this scale is regarded as indicative of substantially complete removal of all particles larger than 4 microns.

EXAMPLE 2

Another portion of the ball milled slurry of Example 1 was classified by gravity separation over a time period sufficient to settle out all particles larger than 4 microns in size. This required 90 minutes of settling time. During this period, the $TiO_2$ settled out very slowly leaving a top layer of clear water. The top portion of the $TiO_2$ layer was carefully decanted and tested for texture. This material gave a Hegman scale rating of 2, showing that there had not been a satisfactory separation of the large pigment particles.

EXAMPLE 3

Rutile titanium dioxide pigment which had been calcined in the presence of 1.0% ZnO and which contained 0.7% of water-soluble salts was micropulverized and slurried in water to obtain a liquid mixture containing 250 g. per liter of $TiO_2$. The slurry was divided into 7 portions of 500 cc. each. Using the same sodium silicate described in Example 1, additions to the individual portions were made over a range calculated to give from 0.1% to 2.0% of $SiO_2$ based on the weight of $TiO_2$. The individual samples were transferred to centrifuge bottles and centrifuged for a time calculated to settle out all particles larger than 4 microns. This separation was effected within 3 minutes of cessation of the agitation. After centrifuging, the top portion of the slurry was carefully decanted and labeled as fines, and recovery was calculated from the volume and specific gravity of the portion decanted. The texture of the various samples was determined according to the method described in Example 1. The test results are tabulated below.

| Example | Percent $SiO_2$ Added | pH of Slurry | Hegman Texture Rating | Percent Recovery as Fines |
|---|---|---|---|---|
| 3-a | None | 6.0 | 0 | 10 |
| 3-b | 0.1 | 6.2 | 6- | 41 |
| 3-c | 0.2 | 6.4 | 6 | 55 |
| 3-d | 0.3 | 6.9 | 6½ | 72 |
| 3-e | 0.4 | 7.0 | 6½ | 72 |
| 3-f | 0.6 | 8.2 | 7- | 63 |
| 3-g | 1.0 | 9.3 | 5 | 63 |
| 3-h | 2.0 | 10.1 | 0 | 62 |

EXAMPLE 4

Rutile titanium dioxide pigment which had been calcined in the presence of 1.0% ZnO and which contained 0.7% of water-soluble salts was micropulverized and mixed with water to give a slurry containing 250 g. per liter of $TiO_2$. The slurry was divided into 4 portions and $K_2SO_4$ was added to these portions to give a range of total soluble salt content of from 0.7% to 2.7% based on the weight of $TiO_2$ present. Each portion was then stirred with sodium silicate solution in an amount sufficient to provide the equivalent of 0.6% of $SiO_2$ based on the $TiO_2$ present. The slurries were then hydroclassified by centrifuging within 5 minutes of the cessation of the stirring and their respective texture values were determined as above described. These results are tabulated below.

| Example | Total Soluble Salts, Percent | Percent $SiO_2$ Added | Hegman Texture Rating | Percent Recovery as Fines |
|---|---|---|---|---|
| 4-a | 0.7 | 0.6 | 6½ | 50 |
| 4-b | 1.2 | 0.6 | 6 | 39 |
| 4-c | 1.7 | 0.6 | 6 | 35 |
| 4-d | 2.7 | 0.6 | 6 | 25 |

When the above example was repeated employing equivalent proportions of NaOH, $Na_2CO_3$ and ammonium hydroxide in place of sodium silicate, hydroclassification of the pigment was impossible.

From the foregoing illustrative examples and from the description of the invention it will be seen that titanium dioxide pigments containing more than about 0.5% of water-soluble salts, and which have been calcined in the presence of quantities of conditioning agents equal to or especially greater than those which are ordinarily employed by the industry, present a serious problem concerning the removal therefrom of undesirably large pigment particles. The present invention provides an economical and simple method for the classification of such pigment. This, as has been hereinbefore described, is effected by the use of preferably from about 0.2% to about 0.6% of sodium silicate which, subsequent to sufficient mechanical agitation of the mixture in aqueous slurry form to liberate the +4 micron particles, permits centrifugal classification of the pigment if the classification is performed within a short period of time, preferably within about 1 to 5-10 minutes of cessation of the agitation. The exact time limit cannot be expressed more exactly as this appears to depend on a number of variables, including the solids content of the slurry and the water soluble salt content of the calcined pigment.

I claim:

1. A method of separating +4 micron particles of sintered titanium dioxide from a highly flocculated, calcined, conditioned, rutile titanium dioxide pigment formed by calcination of titania hydrate in the presence of about 1% of a member of the group consisting of zinc oxide and tin oxide, which comprises forming a mobile aqueous slurry from said titanium dioxide and an aqueous alkali metal silicate solution, the alkali metal silicate content of said slurry, calculated as $SiO_2$, being more than 0.1% and less than 1.0% of the weight of the titanium dioxide in said slurry, agitating said slurry to liberate said +4 micron particles, and subjecting said slurry to hydroclassification including centrifugal hydroclassification to remove said particles therefrom, all of said hydroclassification being performed within about 10 minutes after cessation of said agitation and while said particles are in a state of liberation.

2. Process according to claim 1 wherein said alkali metal silicate is sodium silicate.

3. Process according to claim 2 wherein the proportion of $SiO_2$ as alkali metal silicate in said slurry is between about 0.2% and 0.6% of the weight of said $TiO_2$.

WALTER R. WHATELY.

REFERENCES CITED

The following references are of record in the file of this patent:

UNITED STATES PATENTS

| Number | Name | Date |
|---|---|---|
| 1,826,131 | Hanahan | Oct. 9, 1931 |
| 1,937,037 | Hanahan | Nov. 28, 1933 |
| 2,161,651 | Roberts | June 6, 1939 |